(12) United States Patent
Hinkofer et al.

(10) Patent No.: US 9,395,162 B2
(45) Date of Patent: Jul. 19, 2016

(54) IGNITER AND METHOD OF MANUFACTURING AN IGNITER FOR AN INFLATOR

(71) Applicant: TRW Airbag Systems GmbH, Aschau am Innl (DE)

(72) Inventors: Johann Hinkofer, Ampfing (DE); Christoph Knollhuber, Wolfgang (DE); Werner Muller, Muhldorf (DE); Stefan Heigl, Muhldorf (DE); Georg Schonhuber, Oberneukirchen (DE); Horst Laucht, Rott am Inn (DE); Andreas Seidel, Haag (DE)

(73) Assignee: TRW Airbag Systems GmbH (DE)

( * ) Notice: Subject to any disclaimer, the term of this patent is extended or adjusted under 35 U.S.C. 154(b) by 33 days.

(21) Appl. No.: 13/887,559

(22) Filed: May 6, 2013

(65) Prior Publication Data

US 2013/0305948 A1 Nov. 21, 2013

(30) Foreign Application Priority Data

May 16, 2012 (DE) .......................... 10 2012 010 608

(51) Int. Cl.
*F42B 3/10* (2006.01)
*F42B 3/12* (2006.01)

(52) U.S. Cl.
CPC . *F42B 3/12* (2013.01); *F42B 3/124* (2013.01); *F42B 3/125* (2013.01)

(58) Field of Classification Search
CPC .......... F42B 3/103; F42B 3/124; F42B 3/195; F42B 3/12; F42B 3/16; F42B 3/10; B60R 2021/26029; B60R 22/4628; B60R 21/017; B60R 21/264; F42C 19/12
USPC .................................................. 102/202–204
See application file for complete search history.

(56) References Cited

U.S. PATENT DOCUMENTS

| | | | | |
|---|---|---|---|---|
| 2,996,987 A | * | 8/1961 | Paul, Jr. | 102/202.14 |
| 3,315,603 A | * | 4/1967 | Amey et al. | 102/202.7 |
| 5,230,287 A | * | 7/1993 | Arrell et al. | 102/202.5 |
| 5,431,101 A | * | 7/1995 | Arrell et al. | 102/202.5 |
| 6,446,557 B1 | | 9/2002 | Lubbers | |
| 2005/0039623 A1 | | 2/2005 | Furusawa et al. | |
| 2007/0163457 A1 | | 7/2007 | Matsumura et al. | |
| 2007/0261582 A1 | | 11/2007 | Lahitte et al. | |

FOREIGN PATENT DOCUMENTS

| | | |
|---|---|---|
| CN | 1269007 | 10/2000 |
| CN | 1579845 | 2/2005 |
| CN | 1969167 | 5/2007 |
| CN | 101044369 | 9/2007 |
| EP | 1 308 691 | 6/2009 |

* cited by examiner

*Primary Examiner* — Samir Abdosh
(74) *Attorney, Agent, or Firm* — Tarolli, Sundheim, Covell & Tummino LLP

(57) ABSTRACT

A pyrotechnical igniter (100) for an inflator of a vehicle safety system comprises at least two contact pins (102) physically separated from each other by an electrically insulating compound and a bridge wire (110) connected to both contact pins (102) in an electrically conducting manner. A fastening portion (112) in which the bridge wire (110) is welded to the contact pins (102) is provided at each of the contact pins (102).

14 Claims, 4 Drawing Sheets

Fig. 4
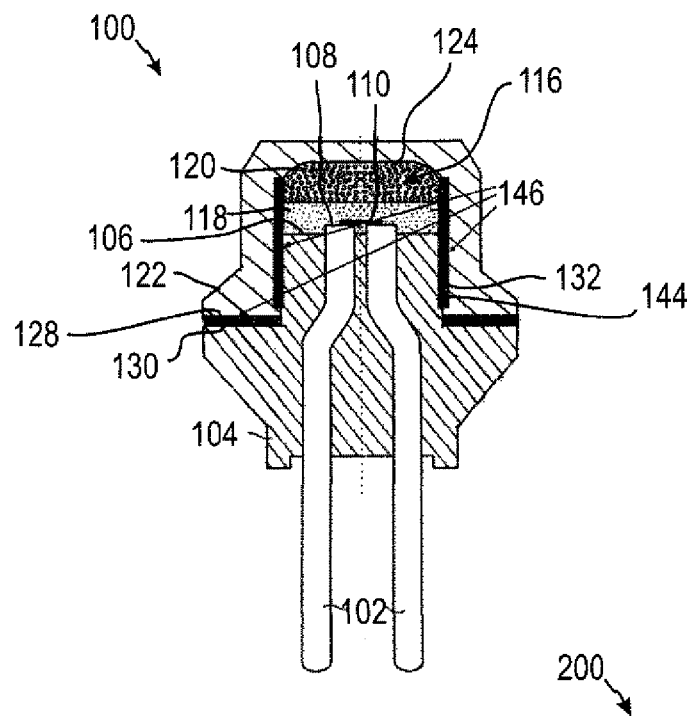
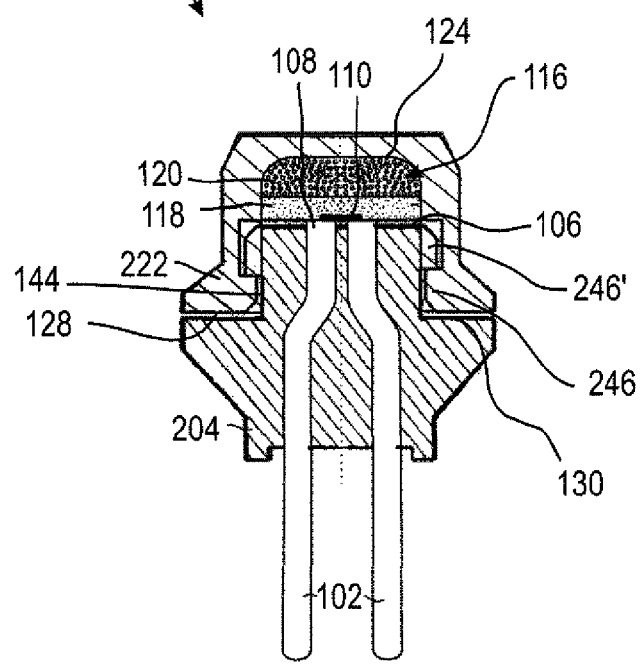
Fig. 5

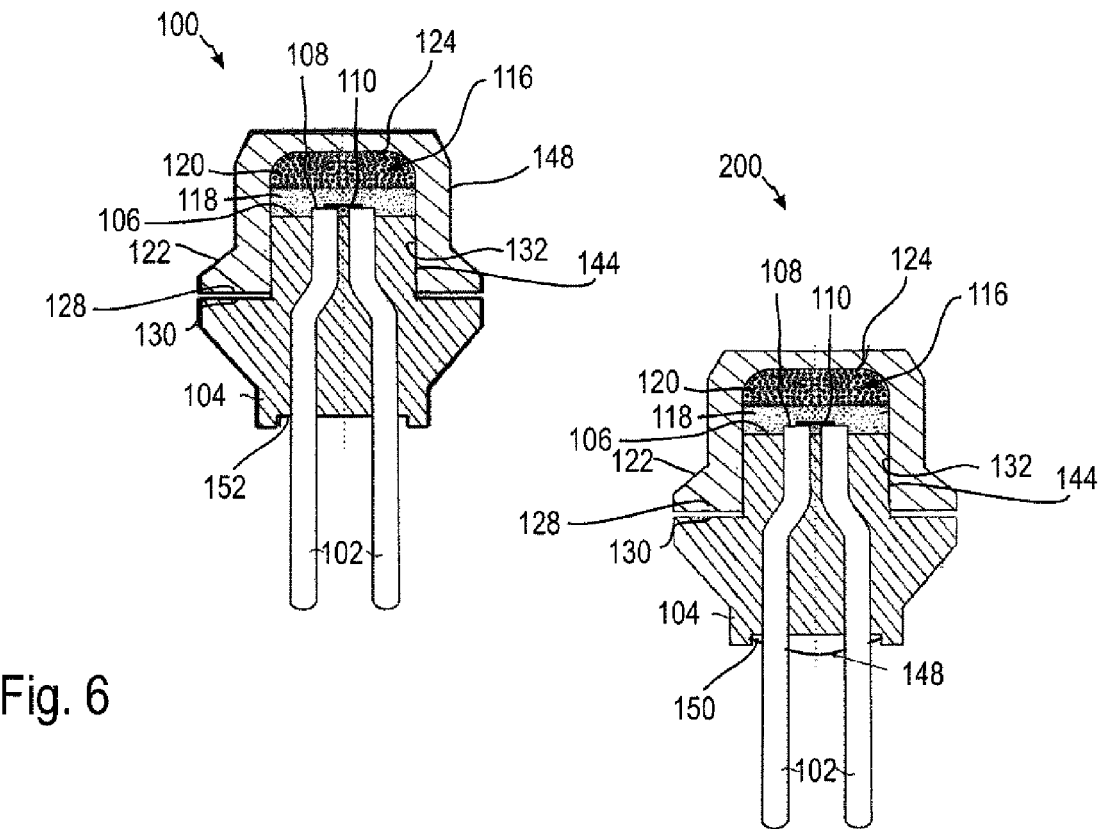
Fig. 6
Fig. 7
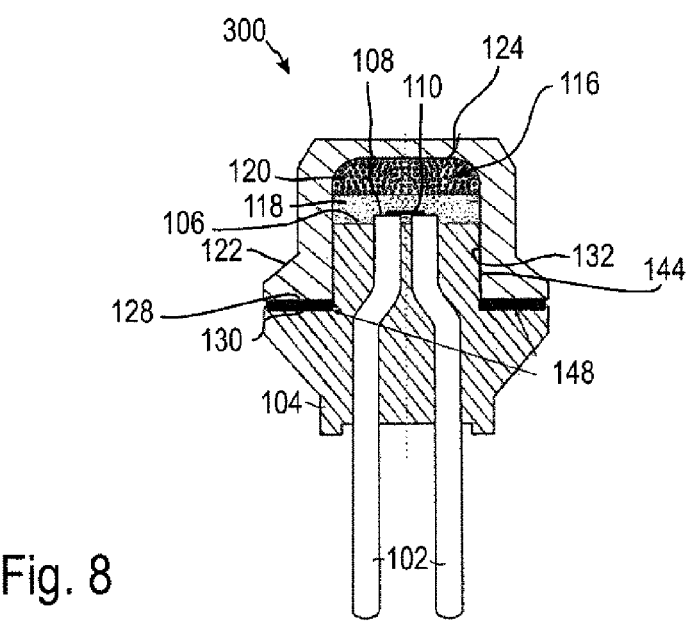
Fig. 8

IGNITER AND METHOD OF MANUFACTURING AN IGNITER FOR AN INFLATOR

RELATED APPLICATION

This application claims priority from German Patent Application No. 10 2012 010 608.4, filed May 16, 2012, the subject matter of which is incorporated herein by reference.

BACKGROUND OF THE INVENTION

The invention relates to a pyrotechnical igniter for an inflator of a vehicle safety system.
Pyrotechnical igniters of this type are electrically ignited and for this purpose have at least two contact pins exposed to a potential difference. In order to avoid uncontrolled flow of current the two contact pins are physically separated from each other by being embedded in an electrically insulating compound such as glass or plastic material.

The insulating compound frequently is part of a pole body that also forms a lower part of the igniter. To the top the igniter is usually closed by a cap connected to the pole body.

The igniting mixture accommodated in a cap of the igniter is ignited by heating a bridge wire connecting the two contact pins due to current flowing through the bridge wire.

An igniter of the afore-mentioned type is known, for instance, from EP 1 308 891 B1.

SUMMARY OF THE INVENTION

It is the object of the invention to provide an igniter having igniting properties that are as reproducible as possible.

This object is achieved by a pyrotechnical igniter comprising the features of claim 1.

Advantageous embodiments are described in the subclaims which can optionally be combined.

In accordance with the invention, in a pyrotechnical igniter for an inflator of a vehicle safety system comprising at least two contact pins that are physically separated from each other by an electrically insulating compound and comprising a bridge wire connected to the two contact pins in an electrically conducting manner a fastening portion in which the bridge wire is welded to the contact pin is provided at each of the contact pins, wherein in a top view a minimum distance between a rim of the fastening portion and the insulating compound amounts to about 0.01-0.5 mm, especially about 0.01-0.2 mm. In this way, the welded joint is very close to the rim of the contact pin which thus counteracts possible contacts of the bridge wire with the rims of the contact pin. For example, such contact due to mechanical load during filling the igniting mixture or by undesired micro-welds between the bridge wire and the contact pin may vary the electric resistance between the contact pins and the efficient length of the bridge wire. In both cases, when current flows through the bridge wire the desired ideal heating is not resulting. This problem is eliminated by arranging the fastening portion for the welded joint as closely to the rim of the contact pin as possible.

At the same time, it is ensured by the invention that the welded joints are not impaired by pollutions or impurities which may be caused by a too small distance from the insulating compound. This is especially important when the insulating compound is a plastic material. A pollution of the welded joint also modifies the electric resistance, wherefrom in turn an uncontrolled heating behavior is resulting.

It has turned out that by selecting the minimum distance of the fastening portion from the rim of the contact pin at a distance of 0.01-0.5 mm and especially of 0.001-0.2 mm undesired variations of resistance can be optimally reduced.

Preferably, each contact pin has an end face protruding from the insulating compound, and the fastening portion is arranged on the end face, the minimum distance being measured from a rim of the end face.

The bridge wire can be a chromium-nickel wire (CrNi wire), for example.

Preferably the bridge wire has a specific resistance of approx. 0.3-0.32 $\Omega mm^2/m$.

Preferred diameters of the bridge wire are approx. 20.8-21.5 µm.

It has turned out that bridge wires having said parameters exhibit especially good results during welding at the afore-mentioned distance as regards the reproducibility of the electric resistance and the heating behavior.

Furthermore, in a pyrotechnical igniter the free ends of the contact pins protruding from the igniter must maintain good electric conductivity during the entire service life of the inflator and also in adverse conditions.

Therefore, it is another object of the invention to provide an igniter which safeguards this in a simple manner.

This object is achieved by a pyrotechnical igniter comprising the features of claim 2 and/or 3.

Advantageous embodiments are described in the subclaims that can optionally be combined.

In accordance with the invention, in an igniter for an inflator of a vehicle safety system comprising at least two contact pins physically separated from each other by an electrically insulating compound each contact pin is provided with a chlorine-free gold coating. The gold coating protects the contact pin against corrosion and ensures good electric contacting between the contact pin and an attached plug. The advantage of a chlorine-free gold coating is that a chlorine-induced corrosion is safely prevented at the contact pins in this way.

Preferably, at least one layer of the entire gold coating is formed by a flash gold coating. This is an extremely thin gold layer having layer thicknesses of less than 0.25 µm, especially preferred of less than 0.13 µm. The layer thickness preferably is 0.05 to 0.08 µm.

It can be sufficient to use only one single flash gold layer to form the entire gold layer.

The deposition of the flash gold layer is preferably carried out chemically, i.e. by current-less deposition, but a galvanic deposition is possible, too.

According to another embodiment the thickness of the entire gold layer is provided to be more than 0.75 µm, especially 0.76 to 0.90 µm.

In this case, too, the deposition is preferably carried out by current-less gold-coating. Galvanic deposition or coating in a different method is also possible, however.

In a further preferred embodiment a flash gold coating is applied to a body of the contact pin, and thereto a hard gold coating is applied.

The flash gold layer preferably has a thickness of less than 0.08 µm. The hard gold layer preferably has a thickness of more than 0.76 µm, especially of 0.76 to 0.90 µm.

Also in this case the hard gold layer and the flash gold layer can be chemically deposited.

The hard gold layer can be applied directly onto the flash gold layer.

According to a further preferred embodiment, a nickel layer is applied between the flash gold layer and the hard gold layer.

The nickel layer is preferably galvanically deposited as sulfamate nickel layer from a nickel sulfamate electrolyte. However, also a current-less deposition is possible.

In contrast to an electrochemical deposition the current-less (chemical) deposition, in the case of both nickel and gold, is a metal deposition from an electrolyte without any voltage applied from outside. The reduction of the metal to be deposited is carried out by oxidation of substances present in the electrolyte solution.

According to a further preferred embodiment, a nickel coating of a thickness of approx. 1.0 to 2.0 μm is applied to the contact pin, and to the nickel layer a gold layer having a thickness of at least 0.76μ is applied, especially having a thickness of 0.76 to 0.90 μm. The gold layer preferably is a hard gold layer.

In all embodiments the contact pins can include a body of 1.4404 stainless steel (also referred to as X2CrNiMo17-12-2 steel).

It is also possible to apply the gold layer in a galvanic process while introducing chlorine traps to a purifying solution used in a subsequent purifying step so that substantially no chloride ions are deposited in the gold layer.

According to a further preferred embodiment, a palladium layer having a thickness of about 50-70 nm, preferably about 70 nm, is applied to the contact pin and onto said palladium layer a gold layer having a maximum thickness of about 10 nm, especially about 5 nm, is applied, which is preferably a galvanic application.

In all cases the afore-mentioned layers preferably form the single coating of the body of the contact pin. However, also further layers could be present.

It is another object of the invention to allow an as simple and inexpensive manufacture of an igniter.

This object is achieved by a pyrotechnical igniter comprising the features of claim 4.

Advantageous embodiments are described in the sub-claims that can optionally be combined.

According to the invention, in an igniter for an inflator of a vehicle safety system a pole body of the igniter and/or a cap outwardly closing off the igniter consists of plastic material having a substantially linear or cross-linked chain structure. Those plastic materials offer the advantage of good processability, mainly compared to cross-linked plastic materials. They have a better flowability, for example, which improves the injection moldability. There is also less formation of vacuoles than with the use of a cross-linked plastic material. Moreover, plastic materials having a linear chain structure can be better dyed.

An especially preferred material for the plastic is polyphenylene sulfide (PPS) in its linear form. While in cross-linked PPS the branched polymer chains are reversibly interlinked via physical cross-linking points, the chains of the only little cross-linked linear PPS accumulate into high-order super-structures and therefore linear PPS mainly exhibits higher toughness and elongation at break than cross-linked PPS. The plastic material can also be cross-linked polyphenylene sulfide.

In another preferred variant the plastic material is glass-fiber reinforced polyamide, especially NYLAFORCE® by Leis Polytechnik. The content of glass fiber in the plastic material preferably amounts to 50%. Such plastic material is very well suited for manufacturing both the pole body and the cap of the igniter by injection molding.

Also the use of other thermoplastics is possible.

Due to their properties all afore-mentioned plastics allow a welded connection between the cap and the pole body so as to fasten the cap to the pole body and to seal the igniter e.g. by ultrasonic welding.

For reasons of cost in terms of material and manufacture, it is further advantageous to manufacture the pole body and the cap of an igniter of plastic material.

Thus it is another object of the invention to provide a simple and inexpensive igniter.

This object is achieved by a pyrotechnical igniter comprising the features of claim 5.

Advantageous embodiments are described in the sub-claims which can optionally be combined.

In accordance with the invention, in a pyrotechnical igniter for an inflator of a vehicle safety system a pole body of the igniter and/or a cap outwardly closing off the igniter are made of a thermosetting plastic. Thermosetting plastics offer the advantage of having high load capacity, exhibiting relatively high temperature stability and being adapted to be manufactured at low cost.

Thermosetting plastics are plastics that in the hardened state have a spatially fine-meshed chemically cross-linked structure so that they are no longer plastically deformable or re-meltable after hardening. Hardening and cross-linking can be performed either during mixing the primary products for the thermosetting plastic by adding catalysts or by thermal activation at high temperatures. Due to these properties, it is possible to process the mixture of primary products in an injection molding process.

Therefore the pole body of the igniter can be easily fabricated by injection molding, wherein preferably the contact pins of the igniter are also injection-molded.

Just as simply the cap of the igniter can be prefabricated as separate component in an injection molding process.

Suitable thermosetting plastics are e.g. polyurethane or polyethylene terephthalate.

Since, because of the properties of the thermosetting plastics a welded connection between the cap and the pole body of the igniter is not possible by ultrasonic welding for example, in a first preferred embodiment the cap is bonded to the pole body of the igniter. Plastics as well as thermosetting plastics can be excellently connected in a fixed, gastight and permanent manner by appropriate adhesives.

Preferably the cap includes a peripheral flat end face that is bonded to a peripheral flat shoulder surface of the pole body. Due to this geometry, the adhesive can be applied in a simple uniform way.

Alternatively or additionally a peripheral portion of an inner circumferential wall of the cap can be bonded to a peripheral portion of the circumferential wall of the pole body. In this case, too, a large-area bonded connection can be easily produced.

Bonding may be the only fastening between the cap and the pole body.

In accordance with another preferred embodiment, the cap includes first engaging elements and the pole body includes second engaging elements, and the cap is in locking engagement with the pole body. A safe tight and permanent connection between the pole body and the cap can also be provided by locking engagement.

For instance, at its free rim the cap can have a peripheral engaging edge which engages in a peripheral engaging projection surrounding an end face of the pole body.

The engaging connection between the cap and the pole body can be the only fastening between the cap and the pole body.

However, it is also possible to combine a locking engagement with a bonding and to use one or more bonded connections e.g. in addition to an engaging connection. The bonded connection and the engaging elements may also be provided at other positions of the cap and the pole body than described above and may be differently configured.

The described connections of the cap and the pole body by bonding and/or locking engagement can also be used in other igniters, as a matter of course, the pole bodies and caps of which are made of any suitable materials.

Furthermore, for the bridge wire nickel chromium alloys having a chromium content of about 20% have been used so far. It is desirable for the contact pins and the bridge wire to have a good electric conductivity and high corrosion resistance while simultaneously showing an optimum specific resistance.

It is another object of the invention to improve the corrosion resistance in a pyrotechnical igniter while maintaining the electrical properties of the electrically conducting elements.

This object is achieved by a pyrotechnical igniter comprising the features of claim 6.

Advantageous embodiments are described in the subclaims which can optionally be combined.

The pyrotechnical igniter for an inflator of a vehicle safety system according to the invention comprises two contact pins and a bridge wire connected to the two contact pins in an electrically conducting way. The bridge wire consists of a nickel alloy including chromium at percentages of from 11 to 24%, molybdenum at percentages of from 12.5 to 17% and optionally additions of iron at percentages of from 0 to 7% and/or tungsten at percentages of from 0 to 4.5%. The specific resistance of the bridge wire is within the range of from 0.25-3 $\Omega mm^2/m$.

All percentages are percent by weight.

The nickel alloy of the contact pins preferably is selected from the group consisting of NiCr21 Mol 4W (material number 2.4602), NiCr23Mo16Al (material number 2.4605), NiMo16CrTi (material number 2.4610) and NiMo16Cr15W (material number 2.4819). Said materials exhibit both a sufficient electrical conductivity for ensuring safe ignition of the igniter and a high corrosion resistance so that the functioning of the igniter is guaranteed during the entire service life of the inflator.

In accordance with a preferred embodiment, the bridge wire has a specific resistance of from 0.25 to 2 $\Omega mm^2/m$ or from 0.25 to 1.3 $\Omega mm^2/m$.

Preferably the contact pins and the bridge wire are made of the same material to obtain optimum material compatibility.

According to a further embodiment, the contact pins can be formed of austenitic stainless steel having a nickel content of from 10 to 14% and a content of molybdenum of from 0 to 2.5%. An example of such stainless steel is X2CrNiMo17-12-2 (material number 1.4404).

Furthermore, when the igniter has a cap that is initially separate from the pole body and is not filled with the igniting mixture before it is connected to the pole body, it is a drawback when moisture can penetrate the interior of the igniter.

Therefore, it is another object of the invention to provide a respective enhancement.

This object is achieved by a pyrotechnical igniter comprising the features of claim 7.

Advantageous embodiments are described in the subclaims which can optionally be combined.

According to the invention, in a pyrotechnical igniter for an inflator of a vehicle safety system comprising a pole body including two contact pins and a cap outwardly closing off the igniter a seal of a sealing compound is provided between the pole body and the cap and/or between the contact pins and the pole body. The seal provides for the igniter and especially the igniting mixture accommodated in the interior of the igniter being hermetically sealed against the ambience and preventing liquids and gases from penetrating. The seal protects especially locations such as the contact area between the pole body and the cap as well as the exit hole of the contact pins from the pole body.

The sealing compound used for sealing can be a resin, an adhesive, a varnish or a plastic, for instance. However, any other substance suited as sealant can be employed as sealing compound. The sealing compound preferably is so fluid that it can be easily processed and also can penetrate gaps in a sealing manner, but it is so viscous that it perfectly adheres to the cap, the pole body and the contact pins to form a continuous seal.

In a preferred embodiment the pole body and/or the cap are coated with the seal at least in portions. In particular, the sealing compound covers a gap between the cap and the pole body.

The seal can completely cover the pole body and the cap. In this case the seal is advantageously produced by immersing the igniter into the sealing compound or by injection molding the sealing compound around the igniter.

It can also be sufficient to provide the seal in a gap between the cap and the pole body. Those gaps can be left, for example, during ultrasonic welding of the cap and the pole body, as the cap and the pole body may not be superimposed seamlessly at all points over the entire periphery of the igniter, although they are interconnected over the entire periphery. The seal can be introduced into such gap and fill the same so that a smooth surface is formed at the outside of the igniter at the transition between the cap and the pole body.

Preferably the seal is disposed between an end face of the cap and a shoulder surface of the pole body, as a gap might be left here during ultrasonic welding or in the case of other connections between the pole body and the cap.

It is also possible to form a pouch in the pole body and/or in the igniter directly by the shape of the respective part into which pouch the sealant is injected so as to be able to introduce a larger amount of sealant into the gap.

The seal can increase the stability of the igniter due to its adhesive effect.

Preferably the seal also covers an exit hole of the contact pins from the pole body and surrounds at least portions of both contact pins. In this way also the exit hole of the contact pins from the pole body is sealed safely and reliably.

Furthermore, the power of the igniter is determined by the amount and type of the igniting mixture accommodated in the cap.

Thus it is another object of the invention to permit a higher igniter power.

This object is achieved by a pyrotechnical igniter comprising the features of claim 8.

Advantageous embodiments are described in the subclaims which can optionally be combined.

In a pyrotechnical igniter for an inflator of a vehicle safety system comprising a pole body including at least two contact pins and a cap outwardly closing off the igniter the length of the cap in the longitudinal direction of the igniter amounts to approx. 7 to 15 mm, especially approx. 8 to 12 mm. Due to the extension of the cap vis-à-vis the cap of a conventional igniter (length of approx. 6 mm) a larger amount of igniting mixture can be disposed in the cap thus enhancing the igniting power.

The diameter of the cap and the diameter of the pole body remain preferably unchanged compared to a conventional igniter so that the igniter can substantially be mounted like a conventional igniter.

The diameter of the cap is 5 to 11 mm, especially 6 to 10 mm. The diameter of the cap is measured in the area of its closed end face and, respectively, in the area of its circumferential wall.

In a preferred manner, the cap is dimensioned so that it can accommodate about 250 to 800 mg ZPP (zirconium potassium perchlorate), especially about 260 to 600 mg ZPP.

Especially preferred is a length of the cap of about 11 to 12 mm for accommodating 600 mg ZPP.

As stated in the foregoing, the insulating compound is part of a pole body also constituting a lower part of the igniter. To the top the igniter is closed by a cap connected to the pole body. Inside the cap an igniting mixture which is ignited by heating the bridge wire is accommodated in an ignition chamber. As a result of the thus formed increasing internal pressure in the igniter the cap breaks or the cap is opened so that hot gases and/or particles can escape and are capable of igniting the main propellant charge of the inflator.

Therefore it is a further object of the invention to provide an igniter in which the opening behavior of the cap can be easily influenced.

This object is achieved by a pyrotechnical igniter comprising the features of claim 9 and/or 10.

Advantageous embodiments are described in the subclaims which can optionally be combined.

It is provided according to the invention that in an igniter for an inflator of a vehicle safety system comprising a pole body including at least two contact pins and a cap outwardly closing off the igniter the cap includes two different plastic components. In this way the opening behavior can be specifically influenced by the selected materials in a cap designed in one piece due to the different materials used in different sections of the cap.

So an end wall of the cap can be made of a softer or more brittle plastic than a circumferential wall of the cap. The circumferential wall thus can be more rigid per se than the end wall, while a predetermined opening zone is already defined by the material of the end wall of the cap. The circumferential wall can also be specifically reinforced by the selection of a hard plastic material so that the gas pressure is directed toward the end face of the cap.

Of advantage, the end wall of the cap is made of a plastic within a range of Shore hardness between D30 and D80 and/or the circumferential wall of the cap is made of a plastic within a range of Shore hardness between D80 and D95.

This is especially advantageous when the height of the cap in the longitudinal direction of the igniter is selected to be larger than a standard value, i.e. for example larger than 6.5 mm, preferably 7 to 15 mm.

By using two or more different plastic components the break strength, toughness or hardness of the cap thus can be specifically adjusted in different sections without the geometric dimensions of the cap, e.g. the thickness of the circumferential wall or the end wall, having to be modified or structural weakening zones such as notches or zones of reduced wall thickness having to be provided.

To manufacture such cap preferably two or more plastic components are introduced into an injection mold and the entire cap is fabricated in the same processing step. In the finished cap different plastic materials are provided at different locations of the cap.

In a pyrotechnical igniter the igniting mixture is ignited by heating a bridge wire connecting the two contact pins due to current flowing through the bridge wire. Because of the gas pressure developing inside the cap, the latter breaks at predetermined points. The outflowing hot gas and/or hot particles then ignite a main propellant charge of the inflator.

For directing the gas flow out of the igniter weakening zones are frequently disposed in the cap.

Therefore it is a further object of the invention to provide an igniter which ensures rapid and uniform ignition of the propellant charge of an inflator in a simple manner.

This object is achieved by a pyrotechnical igniter comprising the features of claim 11.

Advantageous embodiments are described in the subclaims that can optionally be combined.

In accordance with the invention, in an igniter for an inflator of a vehicle safety system comprising a pole body including at least two contact pins and a cap outwardly closing off the igniter and including a predetermined weakening zone in which the material of the cap yields under the internal pressure in the igniter upon activation of the igniter, the weakening zone is disposed in a lateral circumferential wall of the cap. In known igniters the weakening zone is formed at the end face of the cap so that the cap breaks in the longitudinal direction of the igniter and the gas flows out in the longitudinal direction of the igniter. According to the invention, on the other hand weakening zones are provided in the lateral circumferential wall of the cap so that gas flows out in vertical direction to the longitudinal extension of the igniter. In this way, the hot gas flowing out of the igniter can be introduced specifically at plural locations into a propellant charge of the inflator surrounding the igniter and thus uniform ignition of said propellant charge can be effectuated.

It is possible to provide, in addition to the lateral weakening zone(s), a further weakening zone in the end face of the igniter.

The weakening zone can be formed, for instance, by at least a notch, an embossment, a reduced wall thickness and/or the use of a more resilient plastic material than in the residual circumferential wall of the cap.

Upon activation of the igniter, the weakening zone preferably forms a gas outlet orifice. For this purpose, the weakening zone preferably has a circular or slit shape. After breaking the weakening zone the cap substantially retains its geometrical shape.

A lateral discharge of the gas from the igniter is advantageous, for example, when the cap of the igniter contains a larger amount of igniting mixture than it is provided in standard inflators. In this way, larger amounts of gas can rapidly flow into the surrounding propellant charge of the inflator.

The use of said lateral discharge orifices, optionally in combination with a cap containing e.g. an amount of from 260 to 600 mg ZPP (zirconium potassium perchlorate) as pyrotechnical igniting mixture enables a surrounding main propellant charge of the igniter to directly ignite without providing further booster charges in the surroundings of the igniter.

BRIEF DESCRIPTION OF THE DRAWINGS

Further preferred embodiments of the invention constitute the subject matter of the respective subclaims. Hereinafter the invention will be described in detail by way of an embodiment with respect to the enclosed drawing, in which:

FIG. 4 shows a schematic sectional view of an igniter of the invention according to another embodiment;

FIG. 5 shows a schematic sectional view of an igniter of the invention according to another embodiment;

FIG. 6 shows a schematic sectional view of an igniter of the invention according to another embodiment;

FIG. 7 shows a schematic sectional view of an igniter of the invention according to another embodiment;

FIG. 8 shows a schematic sectional view of an igniter of the invention according to another embodiment;

DESCRIPTION

Figure 1:
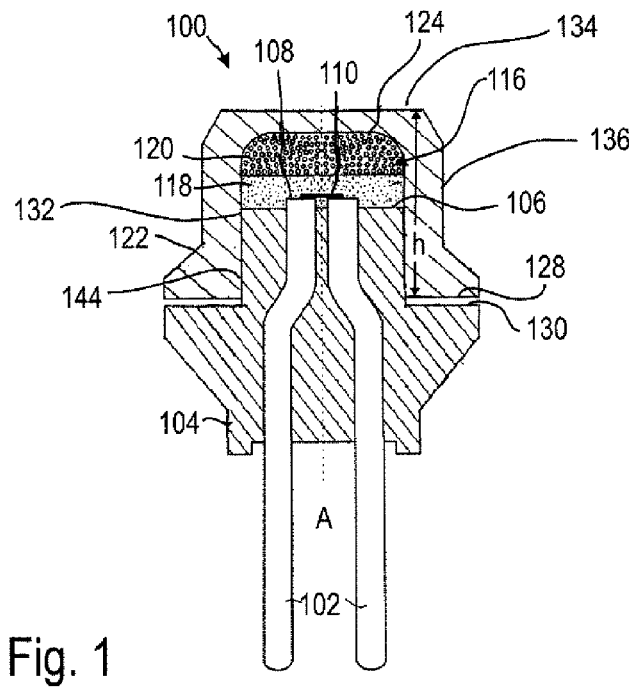
FIG. 1 shows a schematic sectional view of an igniter according to the invention.
Figure 2:
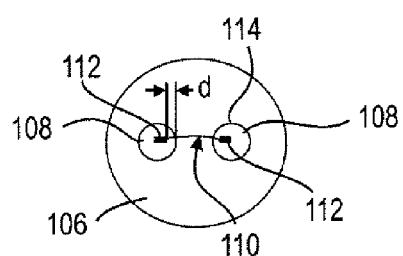
FIG. 2 shows a schematic top view onto the end face of the pole body of the igniter of FIG. 1.

FIG. 1 illustrates an igniter 100. The igniter 100 has two electric contact pins 102 which in portions extend in parallel to each other. The two contact pins 102 are embedded in an electrically insulating compound at a distance from each other. The insulating compound is part of a pole body 104 forming the lower portion of the igniter 100. In this case the insulating compound and the pole body 104 are integrally made of an appropriate plastic material.

The upper end of the pole body 104 is enclosed by a cap 122 connected to the pole body 104. The interior of the cap 122 defines an ignition chamber 124 in which an igniting mixture 116 is accommodated. The igniting mixture 116 is subdivided in this example into a primary ignition charge 118 and a secondary ignition charge 120, wherein also a further added tertiary ignition charge is imaginable.

At its free rim the cap 122 includes a flat end face 128 facing a flat shoulder surface 130 of the pole body 104. A cylindrical inner circumferential wall 132 of the cap 122 surrounds the upper end of the pole body 104. The closed end of the cap 122 forms a flat end wall 134. Between the end wall 134 and the radially outwardly projecting rim of the end face 128 the cap 122 has a cylindrical circumferential wall 136. The cap 122 likewise consists of plastic material.

In a first embodiment both contact pins 102 protrude about 0.1 to 1 mm from a flat end face 106 of the insulating compound and of the pole body 104. Also the end faces 108 of the contact pins 102 projecting from the insulating compound are substantially flat.

A bridge wire 110 which is welded at one end in a first fastening portion 112 to the end face 108 at the first contact pin 102 and at its second end in a second fastening portion 112 to the end face 108 of the second contact pin 102 extends between the contact pins 102, more exactly speaking between the end faces 108 of the contact pins 102. In this way, the bridge wire 110 is connected to both contact pins 102 in an electrically conducting manner.

The dimensions of the fastening portion 112 correspond to those of the welded joint between the bridge wire 110 and the contact pin 102.

The position of the fastening portion 112 is selected so that a minimum distance d between a rim of the fastening portion and the insulating compound of the pole body 104, in this case the distance between the rim of the fastening portion 112 and a rim 114 of the end face 108 of the contact pin 102, is between 0.01 and 0.5 mm and, respectively, between 0.01 and 0.2 mm.

In the shown example the bridge wire 110 is a CrNi wire.

The bridge wire 110 has a specific resistance ranging from 0.30 to 0.32 $\Omega mm^2/m$.

In this example the bridge wire 110 has a diameter of from 20.8 to 21.5 µm.

The end face 106 of the pole body 104, the upper ends of the contact pins 102 including the end faces 108 and also the bridge wire 110 including the fastening portions 112 are in contact with the igniting mixture 116. In this example the primary ignition charge 118 is in direct contact with the end face 106 of the pole body 104 and completely surrounds the end faces 108 of the contact pins 102 and the bridge wire 110.

Usually the primary ignition charge 118 is formed of a mixture of zirconium and potassium perchlorate. The secondary ignition charge 120 and an optionally further added tertiary ignition charge, respectively, can be made of titanium hydride mixed with potassium perchlorate.

In general, the igniting mixture may contain a composition of an oxidant and an inorganic and/or organic fuel.

The oxidant preferably is at least a perchlorate and/or at least a chlorate.

The inorganic fuel used can be at least a substance out of the group of metals, metal alloys and metal hydrides.

Preferably the inorganic fuel is selected from the group consisting of magnesium, aluminum, magnesium aluminum alloys, titanium, zirconium, titanium aluminum alloys, LiH, $MgH_2$, $LiAlH_4$, TiH, tungsten, zirconium tungsten alloys and the mixtures thereof.

The organic fuel used can be guanidine compounds, tetrazole compounds, triazole compounds, urea compounds, nitro compounds, nitramine compounds, dicarboxylic acids, polymer compounds as well as the salts and mixtures thereof.

The fuel can consist of the inorganic fuel, the organic fuel and a mixture of the inorganic and the organic fuel.

Alternatively in the igniting mixture also explosives such as potassium dinitrobenzofuroxan can be used without further addition of oxidants.

Such igniting mixture has turned out to be advantageous mainly for igniters the pole body and cap of which are made of plastic material.

Figure 3:
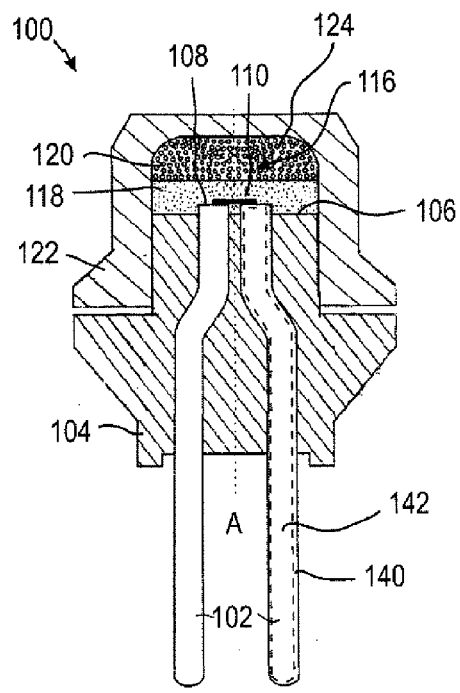
FIG. 3 shows a schematic sectional view of an igniter of the invention according to another embodiment.

In accordance with another embodiment both contact pins 102 are coated with a chlorine-free gold coating 140 (indicated in hatched lines in FIG. 3) at least at their free ends protruding from the pole body 104 of the igniter 100. In the shown embodiment both contact pins 102 are completely coated with the gold coating 140.

However, it is also possible not to coat the portions of the contact pins 102 located inside the pole body 104 and the ignition chamber 124.

According to a first example, a flash gold layer having a thickness of less than 0.25 µm, preferably of less than 0.13 µm, is applied to a body 142 of each contact pin 102. The thickness preferably amounts to 0.05 to 0.08 µm.

A hard gold layer having a layer thickness of more than 0.5 µm is applied to said flash gold layer.

Both layers were deposited current-less in a chemical method.

As in the first example, a flash gold layer is applied to the body 142 of the contact pins 102. On said flash gold layer a nickel layer having a thickness of 1.0 to 2.0 µm was deposited and on said nickel layer a hard gold layer having a thickness of at least 0.7 µm, preferably of 0.76 to 0.90 µm was deposited.

In a first variant the nickel layer is electrodeposited as sulfamate nickel layer.

In a second variant the nickel layer is produced in a current-less chemical deposition.

The gold layer is deposited in a galvanic process, with chlorine traps being contained in a purifying solution which is used in a purifying step utilized prior to deposition. These chlorine traps drastically reduce the number of chloride ions included below the gold layer so that a substantially chlorine-free gold layer is resulting.

In this example a palladium layer having a thickness of about 70 nm is applied to the body 142 of the contact pins 102 and in turn a gold layer having a thickness of about 5 nm is applied to said palladium layer.

In a further embodiment both the pole body 104 and the cap 122 consist of a plastic material having a substantially linear chain structure. However, also cross-linked chain structures, for instance cross-linked polyphenylene sulfate, can be used.

In a first variant the plastic is linear polyphenylene sulfate.

In a second variant the plastic is glass-fiber reinforced polyamide, for instance having a glass fiber content of 50%.

Both the pole body 104 and the cap 122 are manufactured in an injection molding process. The pole body 104 is directly formed by injection molding the contact pins 102 and possibly the insulating compound surrounding the contact pins 102, while the cap 122 is manufactured as separate injection molded part.

After infilling the igniting mixture 116 the cap 122 is attached to the pole body 104 and is connected to the pole body 104 along the entire periphery of the igniter 100, for example by ultrasonic welding.

It is possible to manufacture the pole body 104 and the cap 122 of different plastics.

According to another embodiment, both the pole body 104 and the cap 122 consist of a thermosetting plastic and are fabricated by injection molding.

The pole body 104 is formed directly by coating the contact pins 102, while the cap 122 is manufactured as a separate injection molded part. After infilling the igniting mixture 116, also in this case the cap 122 is attached to the pole body 104 and is connected to the pole body 104 along the entire periphery of the igniter 100.

It is also possible to fabricate only the pole body 104 or only the cap 122 of a thermosetting plastic.

Since ultrasonic welding is not possible in the case of thermosetting plastic, in the igniter 100 shown in FIG. 4 the cap 122 and the pole body 104 are connected by means of a suitable adhesive at plural locations by bondings 146.

In this case two bonding surfaces are provided. On the one hand, the peripheral flat end face 128 of the cap 122 is bonded at the open end of the cap 122 to the peripheral flat shoulder surface 130 of the pole body 104. The shoulder surface 130 of the pole body 104 is offset from the end face 106 of the pole body 104 somewhat toward the free ends of the contact pins 102.

The second bonding surface is formed between the peripheral cylindrical inner circumferential wall 132 of the cap 122 and a portion of a cylindrical circumferential wall 144 of the pole body 104 that is level therewith.

Since both the inner circumferential wall 132 and the end face 128 of the cap 122 and the circumferential wall 144 and the shoulder surface 130 of the pole body 104 are adjacent one another, the two bondings 146 could also be merged.

It is also imaginable, however, to use only one of the described bondings 146.

Each of the bondings 146 can be extensive and can be formed over the entire periphery, but can also be provided only at individual points or portions over the periphery of the pole body 104 and the cap 122.

FIG. 5 shows a variant in which the connection between the cap 222 and the pole body 204 is made by locking engagement.

Correspondingly, first engaging elements 246 and second engaging elements 246' are formed at the cap 222 and at the pole body 204. The first engaging element 246 provided at the cap 222 is formed as peripheral engaging edge projecting radially inwardly at the inner circumferential wall of the cap 222 and being adjacent to the end face 128 of the cap 222.

The second engaging element 246' provided at the pole body 204 is formed as peripheral engaging projection protruding from the circumferential wall 144 of the pole body 204 and forming a rim of the end face 106 of the pole body 204. The first engaging element 246 and the second engaging element 246' are engaged in a form-fit manner along the entire periphery.

It is possible to provide, in addition to the engaging connection, also an adhesive connection, for example as described in the first embodiment between the end face 128 of the cap 222 and the shoulder surface 130 of the pole body 204 and/or the circumferential wall portions 132, 144 of the cap 222 and of the pole body 204.

In a further embodiment the contact pins 102 and the bridge wire 110 consist of NiCr21Mo14W (material number 2.4602), NiCr23Mo16Al (material number 2.4605), NiMo16CrTi (material number 2.4610) or NiMo16Cr15W (material number 2.4819).

Both contact pins 102 and the bridge wire 110 are made of the same material.

It is also possible, however, to use different materials for the bridge wire 110 and the contact pins 102. In such case the contact pins can be made, for instance, of stainless steel (e.g. X2CrNiMo17-12-2 (material number 1.4404)).

The FIGS. 6 to 8 illustrate an embodiment in which a seal 148 of a sealing compound which seals the joints between the cap 222 and the pole body 104 and, respectively, between the contact pins 102 and the pole body 104 in a gastight manner is provided between the pole body 104 and the cap 122 and/or between the contact pins 102 and the pole body 104.

In the variant shown in FIG. 6 the igniter 100 is enclosed almost completely by a seal 148 in the form of a thin layer of a sealing compound made of a resin, adhesive, varnish or plastic material. Merely the end portions of the two contact pins 102 facing the end faces 108 of the contact pins 102, which have to include a respective electrically perfect contacting surface for connection to an electronic ignition device not shown, are not enclosed by the thin layer of the sealing compound.

The seal 148 is produced by immersing the igniter 100 into a container containing the sealing compound. The sealing compound is so thin that it penetrates even the gap e.g. still existing after ultrasonic welding between the end face 128 of the cap 122 at the free end thereof and the shoulder surface 130 of the pole body 104 and coats the wall and side faces of the gap. It is possible that the sealing compound completely fills this gap.

Also the exit hole 150 of the contact pins 102 from the pole body 104 is completely surrounded by the sealing compound so that also gaps possibly existing between the contact pins 102 and the pole body 104 are filled by the sealing compound.

In the variant shown in FIG. 7 only the lower side of the pole body 104 including the two exit holes 150 of the contact pins 102 is covered by the seal 148.

In FIG. 8 an embodiment is shown in which merely the gap between the end face 128 of the cap 122 and the shoulder surface 130 of the pole body 104 is filled with the seal 148.

The three variants shown can also combined with each other by filling the gap between the end face 128 of the cap 122 and the shoulder surface 130 of the pole body 104 with sealing compound in addition to immersing the igniter 100 into the sealing compound, for example. For this, preferably the same sealing compound as for the coating is used. Also the exit holes 150 of the contact pins 102 can be additionally sealed.

The use of such seal 148 is possible, for instance, in combination with a bonding or engagement of the cap 122 with the pole body 104, but also for sealing or filling a gap between the cap 122 and the pole body 104 left during ultrasonic welding.

Figure 9:
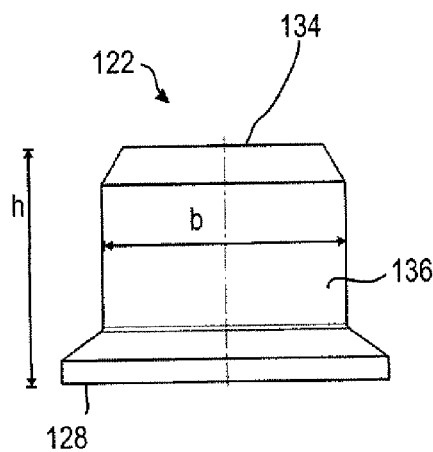
FIG. 9 shows a schematic view of a cap of an igniter of the invention.
Figure 10:
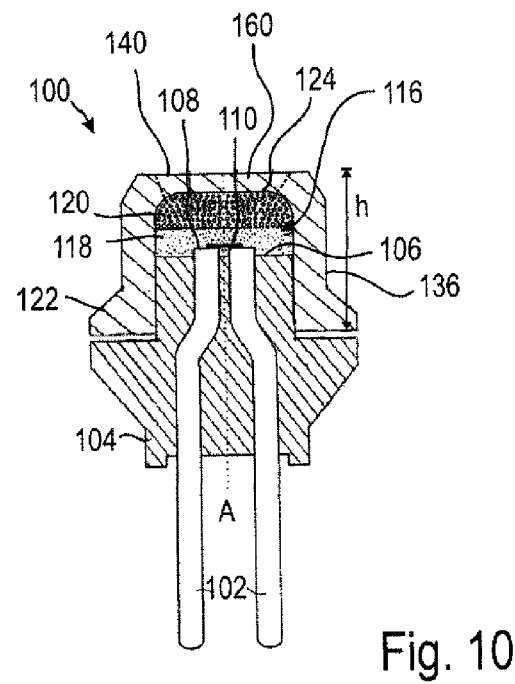
FIG. 10 shows a schematic sectional view of an igniter of the invention according to another embodiment.

In the embodiment shown in FIG. 9, the dimensions of the cap 122 are selected so that its height h, measured from the end face 128 at the free rim of the cap 122 to the outside of the closed end wall 134, is approx. 8 mm. Other lengths larger than the standard length of about 6.2 mm are also usable, the dimensions being selected so that the ignition chamber 124 can accommodate at least about 260 mg ZPP (zirconium potassium perchlorate). In the case of larger heights h of the cap 122 an amount of igniting mixture of up to 600 mg ZPP can be accommodated. For accommodating an amount of propellant of 600 mg preferably a height h of the cap 122 of 11.5 mm is provided.

These specifications relate to the total amount of the igniting mixture 116 including the primary ignition charge 118 and the secondary ignition charge 120 and, respectively, including a possibly optionally added tertiary igniting charge.

Compared to an igniter having standard dimensions, only the height h of the cap 122 but not the diameter b thereof is changed (measured at the outside of the cylindrical circumferential wall 136 of the cap 122). Also the dimensions of the pole body 104 remain unchanged so that the igniter 100 can also be mounted in standard situations.

In accordance with a further embodiment, the cap 122 consists of two different plastic components. In the example shown in FIG. 9, a first relatively hard plastic component is used for the circumferential wall 136 of the cap 122, whereas an end wall 134 of the cap 122 consists of a softer more resilient plastic component. Advantageously hardness values for the relatively hard plastic component are within a range of Shore hardness of from D80 to D95 and for the softer more resilient plastic component are within a range of Shore hardness of from D30 to D80.

This entails the fact that upon ignition of the igniter 100 the circumferential wall 136 yields only insignificantly vertically with respect to the longitudinal direction A and the gas pressure is guided in the direction of the end wall 134. In this way the opening behavior of the cap 122 is specifically influenced so that the end wall 134 breaks and the hot gas escapes at this location.

Mechanical structural weakening zones such as embossments or a reduction of portions of the wall thickness are not necessary.

The height h of the cap 122 in the longitudinal direction A can correspond to standard dimensions.

This embodiment can also be perfectly combined with the afore-described embodiment, however. When a cap 122 having a larger height h is used which is adapted to accommodate a larger amount of igniting mixture 116 (as described before), a better guiding of the gas flow and a well-directed opening of the cap 122 at the predetermined locations, e.g. exclusively at the end wall, can be obtained by a cap 122 composed of two or more different types of plastic.

Figure 11:
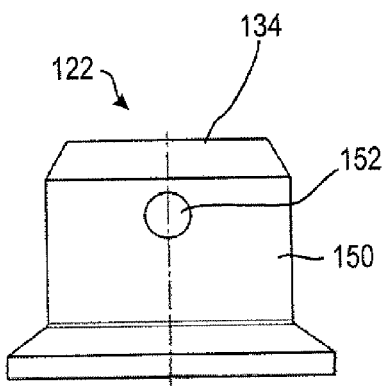
FIG. 11 shows a schematic view of a cap of an igniter according to the invention.
Figure 12:
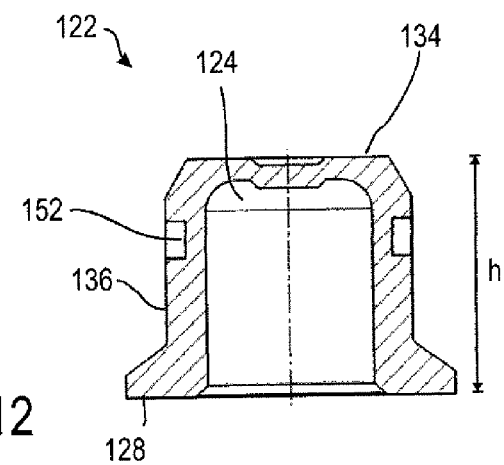
FIG. 12 shows a schematic sectional view of the cap of FIG. 11.

In the embodiment shown in FIGS. 11 and 12 the cap 122 includes plural, in this case two or four weakening zones 152 in its cylindrical circumferential wall 136. The weakening zones are arranged to be offset along the periphery by 180° or 90°. Each of the weakening zones is formed in this example by a reduced wall thickness of the circumferential wall 136 (cf. FIG. 12).

When activating the igniter 100 the weakening zone 152 is destroyed by the increasing internal pressure inside the ignition chamber 124 of the cap 122 so that within the area of the former weakening zones 152 a respective outlet orifice is released or created through which the hot gas can flow out of the igniter 100.

The weakening zones 152 could also be formed by notches or embossments, for example.

It is also possible to form the weakening zones 152 by an area made of a softer or more brittle plastic than the residual circumferential wall 136.

A further weakening zone may be provided in the closed end wall 124 forming a cover of the cap 122. However, there can also be formed a structure constituting a reinforcement so as to ensure that the cap 122 is not opened in the area of the end wall 134.

When using a cap 122 having a larger height h of the cap 122, as described above, and a related larger amount of igniting mixture 116, the lateral discharge of hot gas after ignition of the igniter 100 into a surrounding main propellant charge of an inflator is especially advantageous, because in this way uniform ignition of the propellant charge can be obtained.

As described in detail before, the invention relates to a pyrotechnical igniter comprising especially one or more of the following features or combinations of features.

A pyrotechnical igniter 100 for an inflator of a vehicle safety system comprising at least two contact pins 102 physically separated from each other by an electrically insulating compound and a bridge wire 110 connected to both contact pins 102 in an electrically conducting manner, wherein a fastening portion 112 in which the bridge wire 110 is welded to the contact pin 102 is provided at each contact pin 102, and wherein in a top view a minimum distance d between a rim of the fastening portion 112 and the insulating compound is about 0.01 to 0.5 mm, especially about 0.01 to 0.2 mm.

It is preferred in this context that each contact pin 102 includes an end face 108 protruding from the insulating compound and the fastening portion 112 is arranged at the end face 108, the minimum distance d being measured from a rim 114 of the end face 108.

It is preferred that the bridge wire is a CrNi wire.

It is preferred that the bridge wire has a specific resistance of about 0.3 to 0.32 $\Omega mm^2/m$.

It is preferred that the bridge wire has a diameter of approx. 20.8 to 21.5 µm.

A pyrotechnical igniter for an inflator of a vehicle safety system comprising at least two contact pins 102 physically separated from each other by an electrically insulating compound, each contact pin 102 being provided with a chlorine-free gold coating 126.

It is preferred in this case that at least one layer of the entire gold coating is formed by a flash gold coating.

It is preferred that the thickness of the entire gold layer is at least 0.76 µm.

It is preferred that to a body 128 of the contact pin 102 a flash gold coating is applied and to the latter a hard gold coating is applied.

It is preferred that a nickel layer is applied between the flash gold coating and the hard gold coating.

It is preferred that the nickel layer is deposited from a nickel sulfamate electrolyte or in a current-less manner.

It is preferred that a coating including about 1.0 to 2.0 μm nickel is applied to the body 128 of the contact pin 102 and a gold layer having a thickness of at least 0.76 μm is applied to the nickel layer.

It is preferred that the body 128 of the contact pins 102 consists of 1.4404 stainless steel.

A method of manufacturing a pyrotechnical igniter, wherein it is preferred that the gold layer is applied in a galvanic process, chlorine traps being introduced into a purifying solution used in a preceding purifying step.

It is preferred that to the body 128 of the contact pin 102 a palladium layer having a thickness of about 50-100 nm, preferably 70 nm, is applied and to the palladium layer a gold layer having a thickness of about 5-10 nm, preferably about 5 nm, is applied.

An igniter for an inflator of a vehicle safety system, wherein a pole body of the igniter and/or a cap outwardly closing off the igniter consists of a plastic material having a substantially linear or cross-linked chain structure.

It is preferred that the plastic material is linear polyphenylene sulfide.

It is preferred that the plastic material is cross-linked polyphenylene sulfide.

It is preferred that the plastic material is a glass-fiber reinforced polyamide.

It is preferred that the glass fiber content in the plastic is about 50%.

An igniter for an inflator of a vehicle safety system, wherein a pole body 104; 204 of the igniter 100; 200 and/or a cap 122; 222 outwardly closing off the igniter 100; 200 is made of thermosetting plastic.

It is preferred that the cap 122; 222 is bonded to the pole body 104; 204 of the igniter 100; 200.

It is preferred that the cap 122; 222 includes a peripheral flat end face 128 bonded to a peripheral flat shoulder surface 130 of the pole body 104, 204.

It is preferred that a peripheral portion of an inner circumferential wall 132 of the cap 122; 222 is bonded to a peripheral portion of the circumferential wall 144 of the pole body 104; 204.

It is preferred that the cap 222 includes first engaging elements 246 and the pole body 204 includes second engaging elements 246' and the cap 222 is engaged in the pole body 204.

It is preferred that at its free end the cap 222 includes a peripheral engaging edge that is engaged in a peripheral engaging projection surrounding an end face 106 of the pole body 204.

A pyrotechnical igniter for an inflator of a vehicle safety system comprising at least two contact pins 102 and a bridge wire 110 connected to the two contact pins 102 in an electrically conducting manner, wherein the bridge wire consists of a nickel alloy with chromium at percentages of 11 to 24%, molybdenum at percentages of 12.5 to 17% as well as optionally additions of iron at percentages of 0 to 7% and/or tungsten at percentages of 0 to 4.5% and the specific resistance of the bridge wire ranges from 0.25 to 3 $\Omega mm^2/m$.

It is preferred that the nickel alloy is selected from the group consisting of NiCr21Mo14W material number 2.4602, NiCr23Mo16Al material number 2.4605, NiMo16CrTi material number 2.4610 and NiMo16Cr15W material number 2.4819.

It is preferred that the specific resistance ranges from 0.25 to 2 $\Omega mm^2/m$, preferably from 0.25 to 1.3 $\Omega mm^2/m$.

It is preferred that the contact pins 102 and the bridge wire 110 are made of the same material.

It is preferred that the contact pins 102 are made of austenitic stainless steel having a nickel content of 10 to 14% and a molybdenum content of 0 to 2.5%.

It is preferred that the stainless steel is X2CrNiMo17-12-2 material number 1.4404.

A pyrotechnical igniter for an inflator of a vehicle safety system comprising a pole body 104 including two contact pins 102 and a cap 122 outwardly closing off the igniter 100, wherein a seal 148 of a sealing compound is provided between the pole body 104 and the cap 122 and/or between the contact pins 102 and the pole body 104.

It is preferred that the sealing compound used for sealing consists of a resin, adhesive, varnish or plastic.

It is preferred that at least portions of the pole body 104 and/or the cap 122 are coated by the seal 148.

It is preferred that the seal 148 completely covers the pole body 104 and the cap 122.

It is preferred that the seal 148 is provided in a gap between the cap 122 and the pole body 104.

It is preferred that the seal 148 is disposed between an end face 128 of the cap 122 and a shoulder surface 130 of the pole body 104.

It is preferred that the seal 148 covers an exit hole of the contact pins 102 from the pole body 104 and surrounds at least portions of both contact pins 102.

A pyrotechnical igniter for an inflator of a vehicle safety system comprising a pole body 104 including at least two contact pins 102 and a cap 122 outwardly closing off the igniter 100, wherein the length h of the cap 122 in the longitudinal direction A of the igniter 100 is about 7 to 15 mm, especially about 8 to 12 mm.

It is preferred that the diameter b of the cap 122 is 5 to 11 mm, especially 6 to 10 mm.

It is preferred that the cap 122 is dimensioned so that it can accommodate approx. 250 to 800 mg ZPP, especially approx. 260 to 600 mg ZPP.

A pyrotechnical igniter for an inflator of a vehicle safety system comprising a pole body 104 including at least two contact pins 102 and a cap 122 outwardly closing off the igniter 100, the cap 122 including two different plastic components.

It is preferred that an end wall 134 of the cap 122 is made of softer plastic material than a circumferential wall 150 of the cap 122.

It is preferred that the end wall 140 of the cap 122 is made of plastic material with a Shore hardness ranging from D30 to D80 and/or the circumferential wall 150 of the cap 122 is made of plastic material with a Shore hardness ranging from D80 to D95.

A method of manufacturing an igniter, wherein it is preferred that the cap 122 is fabricated by injection molding, wherein both plastic components are introduced to an injection mold in the same processing step.

A pyrotechnical igniter for an inflator of a vehicle safety system comprising a pole body 104 including at least two contact pins 102 and a cap 122 outwardly closing off the igniter 100 and having a predetermined weakening zone 152 in which upon activation of the igniter 100 the material of the cap 122 yields under the internal pressure in the igniter 100, the weakening zone 152 being arranged in a lateral circumferential wall 150 of the cap 122.

It is preferred that the weakening zone 152 is formed by at least a notch, an embossment and/or a material weakening.

It is preferred that upon activation of the igniter 100 the weakening zone 152 forms a gas outlet orifice.

All features of the above-described embodiments and examples can be freely combined with each other or exchanged for each other at the discretion of those skilled in the art.

The invention claimed is:

1. A pyrotechnical igniter (100) for an inflator of a vehicle safety system comprising
at least two contact pins (102) physically separated from each other by an electrically insulating compound and a bridge wire (110) connected to both contact pins (102) in an electrically conducting manner, wherein the bridge wire (110) consists of a nickel alloy with chromium at percentages of 11 to 24%, molybdenum at percentages of 12.5 to 17% and the specific resistance of the bridge wire (110) ranges from 0.25 to 3 $\Omega mm^2/m$,
wherein a fastening portion (112) in which the bridge wire (110) is welded to the contact pin (102) is provided at each contact pin (102),
and wherein in a top view a minimum distance (d) between a rim of the fastening portion (112) and the insulating compound is 0.01 to 0.5 mm.

2. The pyrotechnical igniter according to claim 1, wherein each contact pin (102) is provided with a chlorine-free gold coating (126).

3. A method of manufacturing the pyrotechnical igniter according to claim 2, comprising steps of:
introducing chlorine traps into a purifying solution and applying the gold layer in a galvanic process.

4. The pyrotechnical igniter according to claim 1, wherein at least one of a pole body of the igniter and a cap outwardly closing off the igniter are made of plastic material having a substantially linear or cross-linked chain structure.

5. The pyrotechnical igniter according to claim 1, wherein at least one of a pole body (104; 204) of the igniter (100; 200) and a cap (122; 222) outwardly closing off the igniter (100; 200) are made of thermosetting plastic.

6. The pyrotechnical igniter according to claim 1, further comprising a pole body (104) including two contact pins (102) and a cap (122) outwardly closing off the igniter (100), wherein a seal (148) of a sealing compound is provided between at least one of the pole body (104) and the cap (122) and between the contact pins (102) and the pole body (104).

7. The pyrotechnical igniter according to claim 1, further comprising a pole body (104) including the at least two contact pins (102) and a cap (122) outwardly closing off the igniter (100), the length (h) of the cap (122) in the longitudinal direction (A) of the igniter (100) being 7 to 15 mm.

8. The pyrotechnical igniter according to claim 1, further comprising a pole body (104) including the at least two contact pins (102) and a cap (122) outwardly closing off the igniter (100), wherein the cap (122) is formed from two different plastic materials.

9. A method of manufacturing the pyrotechnical igniter especially according to claim 8, comprising the step of fabricating the cap (122) by injection molding, wherein both plastic materials are introduced to an injection mold in the same processing step.

10. A pyrotechnical igniter (100) for an inflator of a vehicle safety system comprising
at least two contact pins (102) physically separated from each other by an electrically insulating compound and a bridge wire (110) connected to both contact pins (102) in an electrically conducting manner,
wherein a fastening portion (112) in which the bridge wire (110) is welded to the contact pin (102) is provided at each contact pin (102),
wherein in a top view a minimum distance (d) between a rim of the fastening portion (112) and the insulating compound is 0.01 to 0.5 mm, and
wherein the igniter further comprises a pole body (104) including the at least two contact pins (102) and a cap (122) outwardly closing off the igniter (100) and having a predetermined weakening zone (152) of reduced material thickness in which upon activation of the igniter (100) the material of the cap (122) yields under the internal pressure in the igniter (100), wherein the weakening zone (152) is arranged in a lateral circumferential wall (150) of the cap (122).

11. The pyrotechnical igniter according to claim 1, wherein in the top view the minimum distance (d) between the rim of the fastening portion (112) and the insulating compound is 0.01 to 0.2 mm.

12. The pyrotechnical igniter according to claim 1, wherein the bridge wire (110) further includes at least one of iron at a percentage of 0 to 7% and tungsten at a percentage of 0 to 4.5%.

13. The pyrotechnical igniter according to claim 7, wherein the length (h) of the cap (122) in the longitudinal direction (A) of the igniter (100) is 8 to 12 mm.

14. A pyrotechnical igniter (100) for an inflator of a vehicle safety system comprising
at least two contact pins (102) physically separated from each other by an electrically insulating compound and a bridge wire (110) connected to both contact pins (102) in an electrically conducting manner,
wherein a fastening portion (112) in which the bridge wire (110) is welded to the contact pin (102) is provided at each contact pin (102),
wherein in a top view a minimum distance (d) between a rim of the fastening portion (112) and the insulating compound is 0.01 to 0.5 mm,
wherein the igniter further comprises a pole body (104) including the at least two contact pins (102) and a cap (122) outwardly closing off the igniter (100), wherein the cap (122) is formed from two different plastic materials, and
wherein the cap (122) includes an axial end wall (134) formed from a first plastic material and a cylindrical wall (136) integral with the axial end wall (134) and formed from a second plastic material harder than the first plastic material.

* * * * *